US012774744B2

(12) United States Patent
Kwon et al.

(10) Patent No.: US 12,774,744 B2
(45) Date of Patent: Oct. 27, 2026

(54) TRANSMISSION CONTROL APPARATUS

(71) Applicant: SL Corporation, Daegu (KR)

(72) Inventors: Hyouk Kwon, Rochester Hills, MI (US); Youngjae Cho, Auburn Hills, MI (US)

(73) Assignee: SL Corporation, Daegu (KR)

( * ) Notice: Subject to any disclaimer, the term of this patent is extended or adjusted under 35 U.S.C. 154(b) by 379 days.

(21) Appl. No.: 18/543,129

(22) Filed: Dec. 18, 2023

(65) Prior Publication Data

US 2025/0198507 A1 Jun. 19, 2025

(51) Int. Cl.

| | |
|---|---|
| ***F16H 59/10*** | (2006.01) |
| ***F16H 59/02*** | (2006.01) |
| ***F16H 59/44*** | (2006.01) |
| ***F16H 61/18*** | (2006.01) |
| ***F16H 61/22*** | (2006.01) |

(52) U.S. Cl.

CPC ....... *F16H 59/105* (2013.01); *F16H 59/0278* (2013.01); *F16H 59/44* (2013.01); *F16H 61/18* (2013.01); *F16H 61/22* (2013.01); *F16H 2059/026* (2013.01); *F16H 2059/0282* (2013.01); *F16H 2061/185* (2013.01); *F16H 2061/223* (2013.01)

(58) Field of Classification Search

CPC .... F16H 59/0278; F16H 59/105; F16H 59/44; F16H 2059/026; F16H 2059/0282; F16H 61/18; F16H 61/22; F16H 2061/185; F16H 2061/223

See application file for complete search history.

(56) References Cited

U.S. PATENT DOCUMENTS

2002/0040615 A1* 4/2002 Tomida .................. F16H 59/10 74/523
2004/0229726 A1* 11/2004 Wilde ................ F16H 59/0217 477/99
2016/0245395 A1* 8/2016 Hong ................... F16H 59/044

* cited by examiner

*Primary Examiner* — Prasad V Gokhale
(74) *Attorney, Agent, or Firm* — United One Law Group LLC; Kongsik Kim; Jhongwoo Peck

(57) ABSTRACT

A transmission control apparatus includes a housing; an inner shaft configured to be rotatable within a predetermined angular range with respect to the housing; a rotation lever configured to be rotatable along with the inner shaft to set a transmission position to one of Park (P), Reverse (R), Neutral (N), or Drive (D) positions; a solenoid disposed in the housing and configured to be interfered with the rotation of the rotation lever; and a fixing means included in the rotation lever and configured to interfere with the solenoid. The fixing means includes interfering members, which are formed to be engageable with a plunger of the solenoid when the plunger protrudes to one side of the solenoid, and inclined members, which are inclined from the interfering members to press the plunger toward the other side of the solenoid.

18 Claims, 12 Drawing Sheets

TRANSMISSION CONTROL APPARATUS

BACKGROUND

1. Technical Field

The present disclosure relates to a transmission control apparatus, and more particularly, to a transmission control apparatus that allows for gear shifting to one of Park (P), Reverse (R), Neutral (N), or Drive (D) positions while reducing transmission shock and enables gear shifting to the P position even when a vehicle's power is turned off.

2. Description of the Related Art

A transmission control apparatus can adjust the gear ratio of the transmission of a vehicle to maintain the engine's rotation in the appropriate range based on the vehicle's speed, and the driver of the vehicle controls the transmission by operating a handle.

Examples of the transmission control apparatus include a manual transmission device, where the driver can change the gear stage, and an automatic transmission device that automatically changes the gear stage based on the vehicle's speed when the driver selects the drive mode (or a Drive (D) position).

In addition to the manual and automatic transmission devices, a sports mode-type transmission control apparatus that can perform both manual and automatic transmission is also being used. The sports mode-type transmission control apparatus primarily performs automatic transmission but is also equipped with a manual shifting function that allows the driver to manually shift by raising or lowering the gear stage.

Meanwhile, the automatic transmission device can be categorized into a rotation lever type or a column type, which can selectively control one of the following modes: parking mode (or a Park (P) position), neutral mode (or a neutral (N) position), reverse mode (or a Reverse (R) position), or drive mode (or the D position).

Typically, a rotation lever-type automatic transmission device adjusts the transmission position mechanically by connecting wires, while a column-type automatic transmission device adjusts the transmission position electronically using electrical signals.

However, there are automatic transmission devices where the control of the transmission position is not properly done due to mechanical coupling structures such as wires. In such transmission devices, problems may occur in adjusting the transmission position when the vehicle's battery is discharged or when the power is cut off due to, for example, an accident. Accordingly, there is a need for technological development to mitigate safety concerns caused by these issues.

SUMMARY

Aspects of the present disclosure provide a transmission control apparatus that allows for gear shifting among Park (P), Reverse (R), Neutral (N), and Drive (D) positions while reducing transmission shock. Further, the transmission control apparatus according to the present disclosure may also enable gear shifting to the P position even when a vehicle's power is turned off.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a transmission control apparatus may include a housing; an inner shaft configured to be rotatable within a predetermined angular range with respect to the housing; a rotation lever disposed to be rotatable along with the inner shaft to set a transmission position to one of Park (P), Reverse (R), Neutral (N), or Drive (D) positions; a solenoid disposed in the housing and configured to be interfered with the rotation of the rotation lever; and a fixing means included in the rotation lever and configured to interfere with the solenoid. The solenoid may include a plunger that moves between a first side and a second side with respect to the solenoid, and the fixing means may include interfering members, which are formed to be engageable with the plunger when the plunger protrudes to one of the first side or the second side of the solenoid, and inclined members, which are inclined from the interfering members to press the plunger toward the other of the first side or the second side of the solenoid.

The fixing means may include a first fixing part, which is provided on one side of the fixing means to selectively interfere with the plunger of the solenoid when the plunger is protruded to the first side of the solenoid. The first fixing part may include a first interfering member, which is configured to interfere with the rotation of the rotation lever from the P position to one of the R, N, or D positions when the plunger is protruded to the first side of the solenoid, and a first inclined member, which is inclined with respect to the first interfering member and configured to press the plunger toward the second side of the solenoid when the rotation lever rotates to the P position from any other positions.

The fixing means may include a second fixing part, which is provided on the other side of the fixing means to selectively interfere with the plunger of the solenoid when the plunger is protruded to the second side of the solenoid. The second fixing part may include a second interfering member, which is configured to interfere with the rotation of the rotation lever from the N position to another position when the plunger is protruded to the second side of the solenoid, and a second inclined member, which is inclined with respect to the second interfering member and configured to press the plunger toward the first side of the solenoid when the rotation lever rotates from the P position to another position.

The first interfering member and the second interfering member may be spaced apart within the predetermined angular range around the solenoid. The first inclined member and the second inclined member may be spaced apart within the predetermined angular range around the solenoid and may be disposed closer to each other than the first and second interfering members.

The first inclined member may be formed as an inclined surface having an angle of 50° to 65° with respect to a direction of movement of the plunger. The second inclined member may be formed as an inclined surface having an angle of 36° to 50° with respect to a direction of movement of the plunger.

The plunger may include an inclined surface that corresponds to an inclination angular range of the first inclined member or the second inclined member where the plunger abuts the first inclined member or the second inclined member.

The transmission control apparatus may further include a magnetic body disposed on one of the rotation lever or the housing; and a position sensor disposed on the other of the rotation lever or the housing and configured to detect relative movement or rotation of the rotation lever with respect to the housing based on a magnetic field generated by the magnetic body.

In response to the rotation lever being positioned at the P position, power to the solenoid being turned off, and a brake pedal having been released, the plunger may protrude to the first side of the solenoid to be engaged with the first interfering member and thereby limit the rotation of the rotation lever.

In response to a brake pedal being operated at the P position, power may be supplied to the solenoid so that the plunger is protruded to the second side of the solenoid, and the rotation lever may become rotatable.

The plunger may be configured to protrude to the first side of the solenoid in response to the position sensor detecting that the rotation lever has passed through a predetermined point between the P position and the R position while rotating from the P position to the R position. When the rotation lever passes through the predetermined point between the P position and the R position, and the rotation speed of the rotation lever exceeds a speed at which the plunger protrudes to the first side of the solenoid, the second inclined member may push a second end of the plunger to allow the plunger to protrude to the first side of the solenoid.

In response to the rotation lever being rotated from one of the R, N, or D positions to the P position, the first end of the plunger rides over the first inclined member to allow the plunger to be engaged with the first interfering member.

In response to the rotation lever being positioned at the N position, a brake pedal having been released, and a vehicle's speed being within a predetermined range, the plunger may protrude to the second side of the solenoid and may be at least partially inserted into the second interfering member to prevent the rotation of the rotation lever.

The inner shaft may include a first rotation axis, about which the inner shaft rotates to be spaced apart from the housing, and the rotation lever may include a second rotation axis, about which the rotation lever rotates along with the inner shaft within the predetermined angular range. The first rotation axis and the second rotation axis may be substantially perpendicular.

The transmission control apparatus may also include an elastic member, which elastically biases an end of the inner shaft away from the rotation lever and toward the housing.

The transmission control apparatus may further include a transmission shifter coupled to a distal end of the inner shaft. As such, in response to the transmission shifter being rotated about the first rotation axis so that a proximal end of the inner shaft is moved away from the housing, the transmission shifter may become rotatable about the second rotation axis to select one of the P, N, R, or D positions.

The transmission control apparatus according to embodiments of the present disclosure may provide the following and advantages. First, as the fixing means is provided with the first inclined member, it is possible to adjust the transmission position to the P position even when the power to the solenoid is cut off.

Second, as the fixing means is provided with the second inclined member, it is possible to prevent the plunger from impacting the second interfering member when the transmission position is rapidly changed from the P position to the R position.

Third, unintended or inadvertent shifting of the transmission shifter can be prevented when the vehicle is stopped at the N position.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
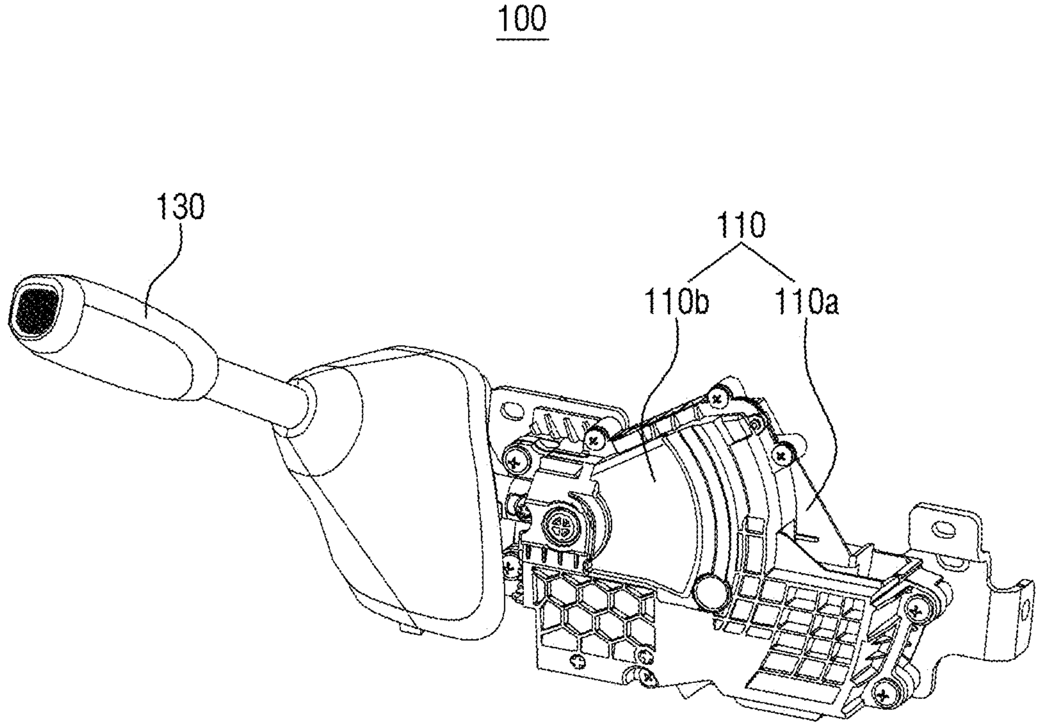
FIG. 1 is a perspective view illustrating a transmission control apparatus according to an embodiment of the present disclosure.

Below, exemplary embodiments of the present disclosure are described in detail with reference to the attached drawings. The benefits and features of the present disclosure and the methods to achieve them will become clear when referring to the detailed embodiments along with the attached drawings. However, the present disclosure is not limited to the embodiments disclosed below and can be implemented in various different forms. The embodiments are provided solely to complete the disclosure and to fully inform a person with ordinary skill in the art, and the invention is defined only by the scope of the claims. Throughout the specification, identical reference numbers refer to identical components.

The present disclosure is subject to various modifications and can have multiple embodiments; specific embodiments are exemplified and described in the drawings. However, this is not intended to limit the present disclosure to the specific embodiments. Rather, it should be understood to include all modifications, equivalents, or substitutes falling within the idea and technical scope of the present disclosure.

Terms that include ordinals such as "first," "second," etc., may be used to describe various components, but the components are not limited by these terms. These terms are used only to distinguish one component from another. For example, without departing from the scope of the present disclosure, a second component may be termed a first component, and similarly, a first component may be termed a second component.

The term "and/or" includes any combination of the listed related items or any of the related items.

When it is mentioned that one component is "connected to" or "coupled with" another component, it should be understood that it may be directly connected or coupled to the other component, or there may be another component in between. On the other hand, when it is mentioned that one component is "directly connected to" or "directly coupled with" another component, it should be understood that there are no other components in between.

The terms used in this application are only for describing particular embodiments and are not intended to limit the disclosure.

Singular expressions, unless explicitly stated otherwise in context, include plural expressions.

In this application, terms like "include" or "have" are used to indicate the existence of the features, numbers, steps, operations, components, parts, or combinations thereof stated in the specification, and do not preclude the existence or addition of one or more other features, numbers, steps, operations, components, parts, or combinations thereof.

Embodiments of the present disclosure will hereinafter be described with reference to the accompanying drawings. The same reference numerals are assigned to identical or corresponding components, regardless of the drawing numbers, and redundant descriptions thereof are omitted.

Figure 2A:
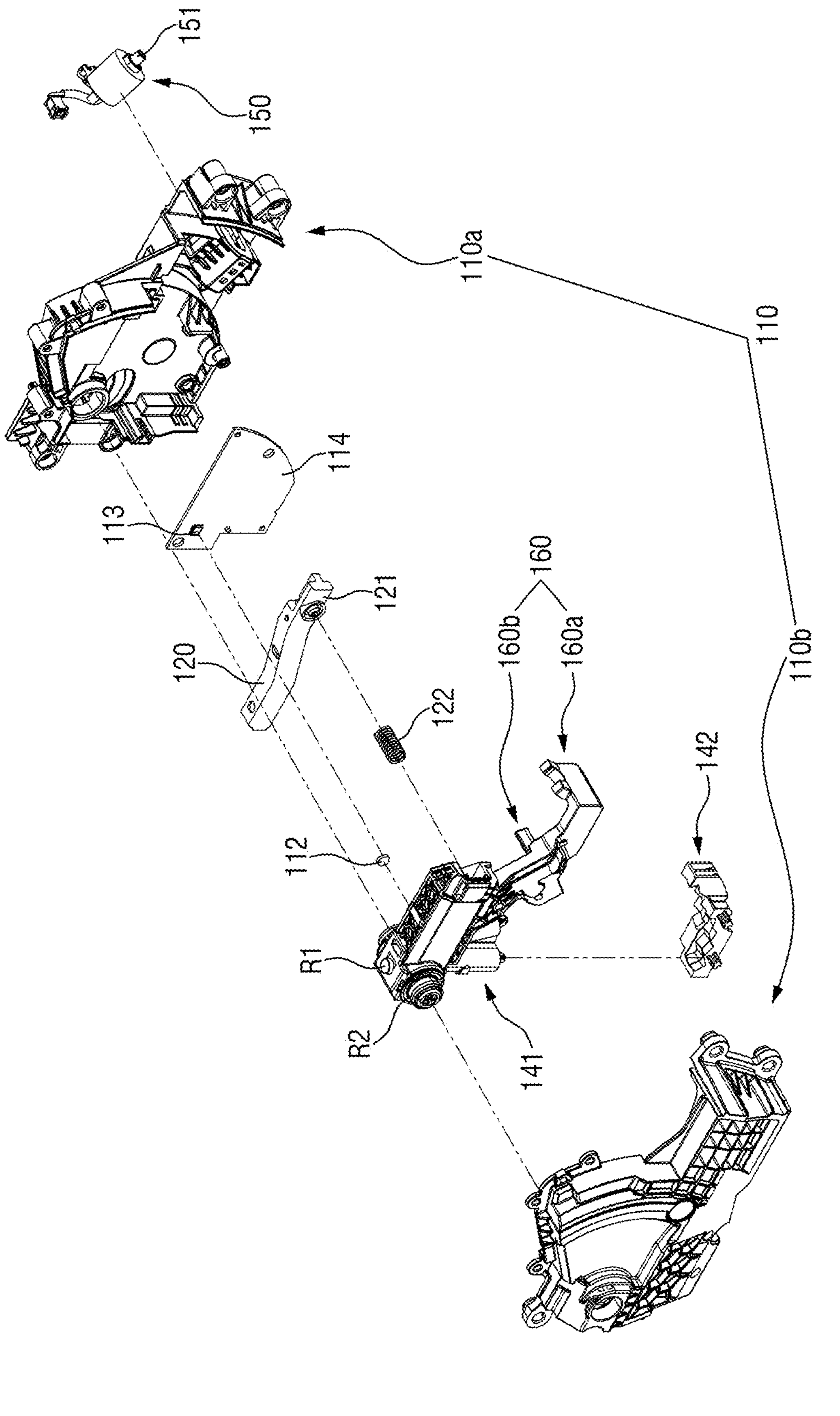
FIG. 2A is an exploded perspective view illustrating the transmission control apparatus of FIG. 1 as seen from the front side thereof.
Figure 2B:
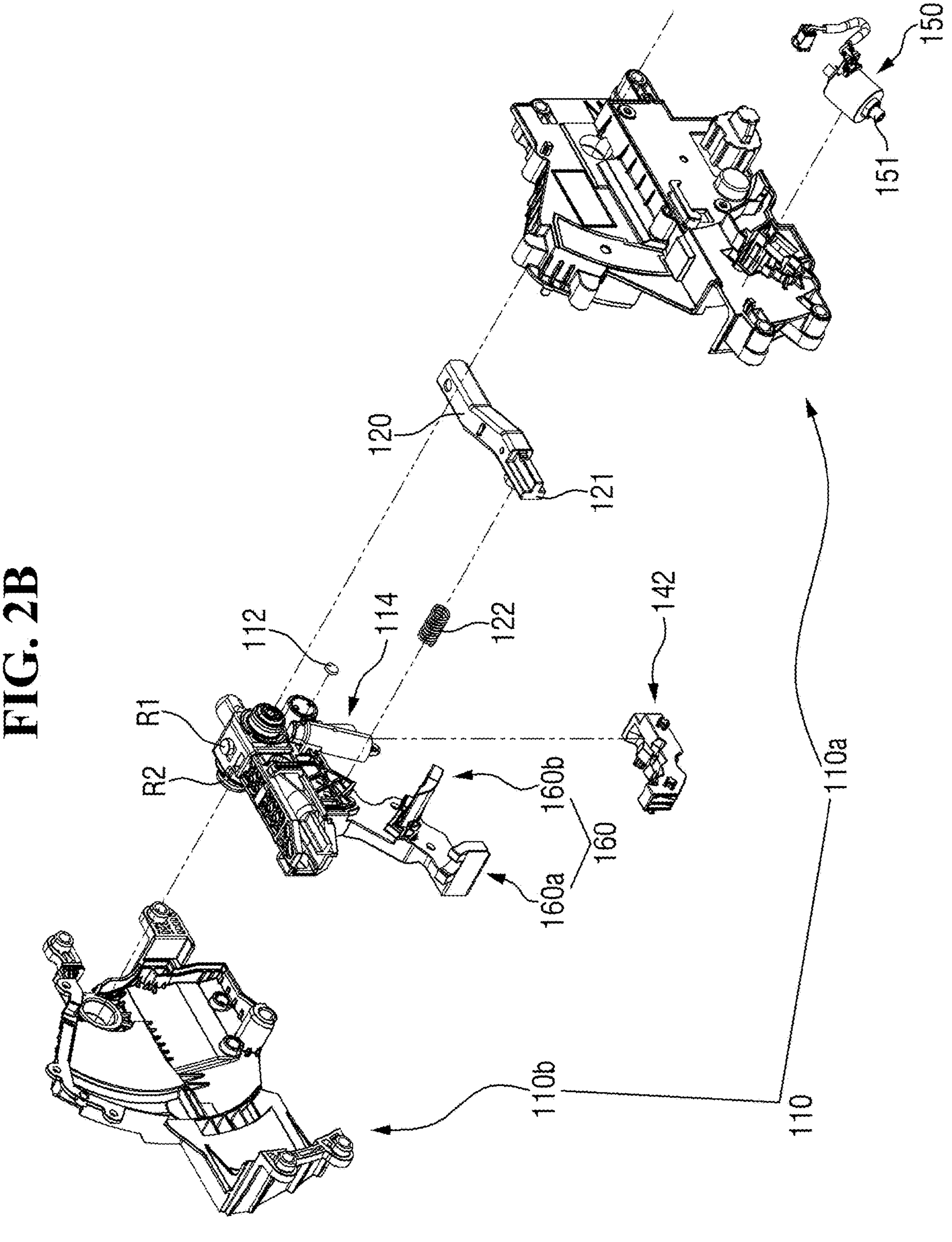
FIG. 2B is an exploded perspective view illustration the transmission control apparatus of FIG. 1 as seen from the rear side thereof.
Figure 3:
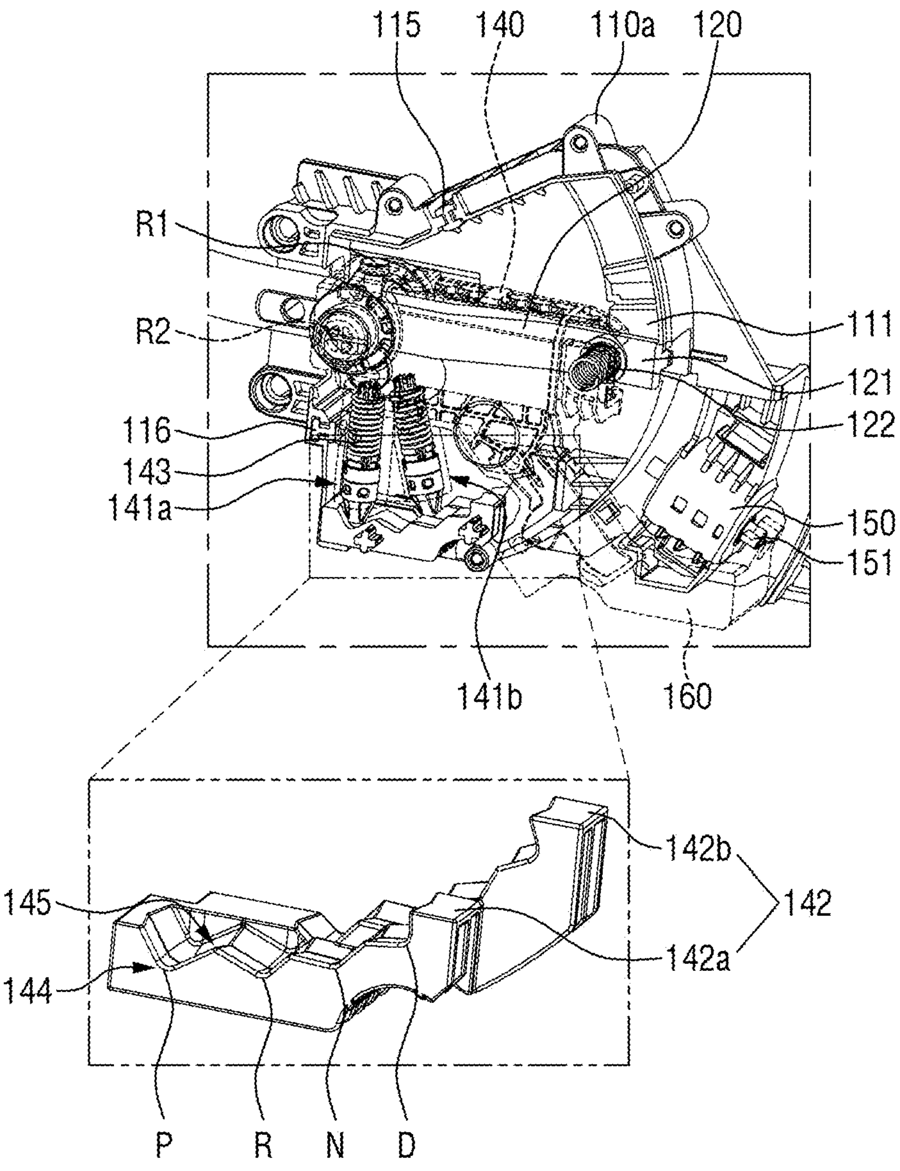
FIG. 3 is a perspective view illustrating the transmission control apparatus of FIG. 1 with a second housing removed therefrom.

FIG. 1 is a perspective view illustrating a transmission control apparatus according to an embodiment of the present disclosure, FIG. 2A is an exploded perspective view illustrating the transmission control apparatus of FIG. 1 as seen from the front side, FIG. 2B is an exploded perspective view illustrating the transmission control apparatus of FIG. 1 as seen from the rear side, and FIG. 3 is a perspective view illustrating the transmission control apparatus of FIG. 1 with a second housing 110*b* removed for illustration purposes.

Referring to FIGS. 1 through 3, a transmission control apparatus 100 may include a housing 110, an inner shaft 120, a transmission shifter 130, a rotation lever 140, and a solenoid 150.

The housing 110 may include first housing 110*a* and a second housing 110*b*. The first and second housings 110*a* and 110*b* may be arranged to face each other on both lateral sides of the housing 110 or on the rear and top sides of the housing 110, and may form an accommodation space inside. Within the accommodation space, the inner shaft 120 and the rotation lever 140 may be installed.

The first and second housings 110*a* and 110*b* may provide a structure that is open on at least one side thereof, and thus, a first end of the inner shaft 120 may be disposed within the housing 110, and a second end of the inner shaft 120 may be connected to the transmission shifter 130 outside of the housing 110. Here, the transmission shifter 130 may be disposed within the driver's reach in the vehicle and configured to be gripped and operated to perform shifting. For example, one of Park (P), Reverse (R), Neutral (N), or Drive (D) positions may be selected.

Additionally, the housing 110 may be provided with the solenoid 150. The solenoid 150 may include a plunger 151, which is configured to protrude outwardly or retracted inwardly by a magnetic force. The plunger 151 may be disposed to move axially.

Also, the inner shaft 120 may be disposed to rotate about two axes with respect to the housing 110. For example, the two axes may be a first rotation axis R1 and a second rotation axis R2. The first rotation axis R1 may be provided on the inner shaft 120, and the second rotation axis R2 may be provided on the rotation lever 140. The first and second rotation axes R1 and R2 may be X- and Y-axes, respectively, arranged to be orthogonal to each other.

Within the rotation lever 140, a hollow space may be formed in the thickness direction of the rotation lever 140 so that the inner shaft 120 may move when rotating about the first rotation axis R1.

Additionally, an elastic member 122 may be provided adjacent to the first end 121 of the inner shaft 120 and between the rotation lever 140 and the inner shaft 120. The elastic member 122 may elastically bias the first end 121 of the inner shaft 120 toward the first housing 110*a* away from the rotation lever 140. Therefore, when no external force is applied by the user, the first end 121 of the inner shaft 120 may be biased toward the first housing 110*a*.

Thus, when the inner shaft 120 is rotated about the first rotation axis R1, the inner shaft 120 may rotate in such a direction that the first end 121 of the inner shaft 120 moves away from the first housing 110*a* and toward the inside of the rotation lever 140. When the inner shaft 120 rotates about the second rotation axis R2 together with the rotation lever 140, the inner shaft 120 and the rotation lever 140 may rotate clockwise or counterclockwise while maintaining a constant distance from the first housing 110*a*. Moreover, when the inner shaft 120 rotates about the first rotation axis R1 such that the first end 121 of the inner shaft 120 moves away from the first housing 110*a*, the inner shaft 120 and the rotation lever 140 may rotate clockwise or counterclockwise.

The housing 110 may include one or more rotation-restricting protrusions 111, which limit the clockwise or counterclockwise rotation of the inner shaft 120 when the inner shaft 120 is disposed toward the first housing 110*a*. Four rotation-restricting protrusions 111 may be disposed to be spaced apart from one another and to correspond to four shifting positions, i.e., the P, R, N, and D positions.

Furthermore, the rotation lever 140 may be configured to be rotatable within a predetermined angular range about the second rotation axis R2 together with the inner shaft 120. The rotation lever 140 may include a magnetic body 112, which is configured to be moved (or rotated) with respect to the housing 110 within the predetermined angular range. The magnetic body 112 may generate a magnetic field. The magnetic field generated by the magnetic body 112 may be detected by a position sensor 113 installed inside the housing 110. For example, the magnetic body 112 may be a permanent magnet, and the position sensor 113 may be a magnetic proximity sensor. Thus, the position sensor 113 may detect the rotation angle of the rotation lever 140 relative to the housing 110 by utilizing the magnetic field from the magnetic body 112. For example, the position sensor 113 may output the rotation angle of the rotation lever 140 relative to the housing 110 as linear data. As the linear data includes continuous rotation angle data depending on the position of the rotation lever 140, the precise rotation angle of the rotation lever 140 may be detected using the linear data output by the position sensor 113. In some embodiments, the magnetic body 112 may be disposed on the housing 110, and the position sensor may be disposed on the rotation lever 140. The position sensor 113 may be disposed on a circuit board 114, which is coupled to the housing 110 (e.g., to an inner side of the first housing 110*a*).

The housing 110 may include a first damper 115 and a second damper 116. The first damper 115 may abut the rotation lever 140 when the rotation lever 140 rotates clockwise to its maximum angle, and the second damper 116 may abut the rotation lever 140 when the rotation lever 140 rotates counterclockwise to its maximum angle. The first and second dampers 115 and 116 may prevent direct contact between the rotation lever 140 and the first housing 110*a* or the second housing 110*b*. Also, the first and second dampers 115 and 116 may be formed of or may include a material such as rubber, silicone, or a synthetic resin to reduce noise and impact resulting from the contact between the rotation lever 140 and the first and second dampers 115 and 116. Herein, the clockwise and counterclockwise directions are described based on the view shown in FIG. 3. The actual directions, however, may vary depending on the viewing position of the apparatus.

Further, the rotation lever 140 may include bullets 141, which protrude from the rotation lever 140 within the housing 110. Groove members 142, which guide the bullets 141 between the shifting positions while being in contact with the bullets 141 may also be provided.

The bullets 141 may be disposed to rotate about the second rotation axis R2 together with the rotation lever 140. The bullets 141 may have a structure that allows their lengths to be elastically adjusted. For example, the bullets 141 may elastically protrude from the rotation lever 140 to their maximum length due to springs 143, but their protrusion lengths may be reduced when pressure is applied toward the rotation lever 140 from the outside, causing the spring 143 to contract.

In some embodiments, four grooves 144 (e.g., detent grooves) corresponding to the four shifting positions, i.e., the P, R, N, and D positions, may be formed in each of the groove members 142, and peaks 145 may be formed between the grooves 144. For example, the length of the bullets 141 may be elastically changed as the bullets 141 move or rotate from the P position to the R position. Therefore, the bullets 141 may protrude at each of the grooves 144 and may retract at each of the peaks 145. Thus, due to the elasticity provided by the springs 143 disposed in the bullets 141, the bullets 141 may be able to protrude at each of the grooves 144 and may have a tendency to maintain their positions unless external force is applied.

Two bullets 141, i.e., bullets 141*a* and 141*b*, and two groove members 142, i.e., groove members 142*a* and 142*b*, may be provided. The bullets 141*a* and 141*b* may be disposed to extend from the rotation lever 140 at different angles, rather than at the same angle and in parallel to each other. Also, the groove members 142*a* and 142*b* may be disposed to have an angle therebetween that corresponds to the angle between the bullets 141*a* and 141*b*. Furthermore, the groove members 142*a* and 142*b* may be arranged such that their grooves 144 may not overlap with one another. For example, a peak 145 of the groove member 142*b* may be disposed on the side of a groove 144 of the groove member 142*a*.

In this manner, even if a problem occurs with the bullet 141*a* and/or the groove member 142*a*, a gear shifting process can still be guided or the shifting state in each of the P, R, N, and D positions can be stabilized with the bullet 141*b* and the groove member 142*b*.

The solenoid 150 may be mounted in the housing 110, and a fixing means 160 may be included in or coupled to the rotation lever 140 to be selectively interfered with by the solenoid 150.

As such, when the rotation lever 140 rotates about the second rotation axis R2, the fixing means 160 may fix the position of the rotation lever 140 by being interfered with the solenoid 150 or may guide the movement of the rotation lever 140 from one shifting position to another shifting position by coming into contact with the plunger 151 of the solenoid 150 to allow slippage.

Figure 4:
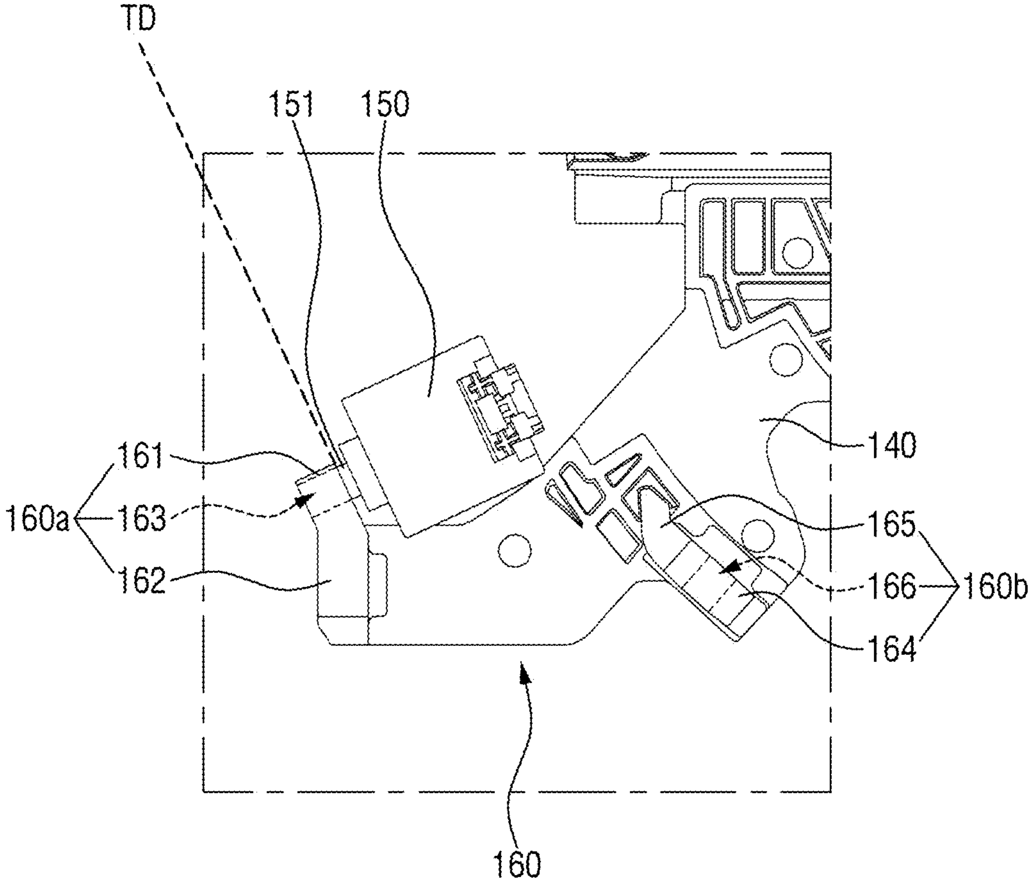
FIG. 4 is a partial enlarged view illustrating a rotation lever of the transmission control device of FIG. 2.

FIG. 4 is a partial enlarged view illustrating the rotation lever of the transmission control device of FIG. 2.

More specifically, FIG. 4 illustrates the fixing means 160 from the opposite direction of that depicted in FIG. 3. In other words, FIG. 4 shows a view as seen from the rear side or the side of the first house 110*a*. Consequently, the directions of the clockwise and counterclockwise rotations of the rotation lever 140, as described with reference to FIG. 4, may differ from those previously discussed in FIG. 3. The rotation lever 140 will hereinafter be described as rotating clockwise or counterclockwise based on its orientation in FIG. 4, and the principles governing the rotation of the rotation lever 140 may be applicable to shifts between the P and D positions, irrespective of the viewpoint.

Referring to FIG. 4, the fixing means 160 may include a first fixing part 160*a* and a second fixing part 160*b*. The same reference numerals may indicate the same components throughout the present disclosure.

The first fixing part 160*a* may include a first interfering member 161 and a first inclined member 162. The first interfering member 161 may be disposed at an outermost portion of the rotation lever 140 to be able to engage with the plunger 151 of the solenoid 150, from the outside, at the P position. The first interfering member 161 may be disposed in a normal (e.g., tangential) direction TD relative to a circumferential direction with respect to the second rotation axis R2. The first interfering member 161 may have a groove or an aperture into which the plunger 151 may be inserted. For example, an aperture 163 may be formed through the first interfering member 161. The first interfering member 161 may be formed to be flat along the normal direction TD or may be formed as a curved surface with a predetermined curvature protruding outwardly along the circumferential direction.

Additionally, the first inclined member 162 may extend integrally from the first interfering member 161 and may be inclined at a predetermined angle not to be parallel to the first interfering member 161. The first inclined member 162 may be formed as an inclined surface such that when the rotation lever 140 rotates counterclockwise from the R position to the P position, a first end of the plunger 151 that protrudes from a first side of the solenoid 150 may be pushed into the solenoid 150 upon contact with the first inclined member 162.

The second fixing part 160*b* may include a second interfering member 164 and a second inclined member 165. The second interfering member 164 may be configured to engage with the plunger 151 of the solenoid 150 from the inside. The second interfering member 164 may be disposed in a normal (e.g., tangential) direction TD relative to a circumferential direction with respect to the second rotation axis R2, and may be disposed not to overlap with the first interfering member 161 in the circumferential direction. The second interfering member 164 may have a groove or an aperture into which the plunger 151 may be inserted. For example, an aperture 166 may be formed through the second interfering member 164. The second interfering member 164 may be formed to be flat along the normal direction TD or may be formed as a curved surface with a predetermined curvature protruding outwardly along the circumferential direction.

Additionally, the second inclined member 165 may extend integrally from the second interfering member 164 and may be inclined at a predetermined angle not to be parallel to the second inclined member 165. The second inclined member 165 may be formed as an inclined surface such that when the rotation lever 140 rotates clockwise from the P position to the R position, a second end of the plunger 151 that protrudes from a second side of the solenoid 150 may be pushed into the solenoid 150 upon contact with the second inclined member 165.

To facilitate smoother operation when the plunger 151 contacts the first and second inclined members 162 and 165, both ends of the plunger 151 may include an inclined surface 152 (e.g., a chamfered edge). The inclination angle of the inclined surface 152 may correspond to the inclined angular range of the first or second inclined member 162 or 165.

The first and second interfering members 161 and 164, or the first and second inclined members 162 and 165, may be spaced apart within a predetermined angular range, in a clockwise or counterclockwise direction, around the solenoid 150. More specifically, the first and second inclined members 162 and 165 may be spaced apart within a predetermined angular range around the solenoid 150 and may be disposed closer to each other than the first and second interfering members 161 and 164.

The plunger 151 may come into direct contact with the fixing means 160. In some other embodiments, a separate contact member may be provided on the plunger 151 to come into indirect contact with the fixing means 160.

FIGS. 5 through 11 are front views illustrating the relationship between the solenoid and the rotation lever according to the transmission position of the transmission control apparatus of FIG. 1.

Figure 5:
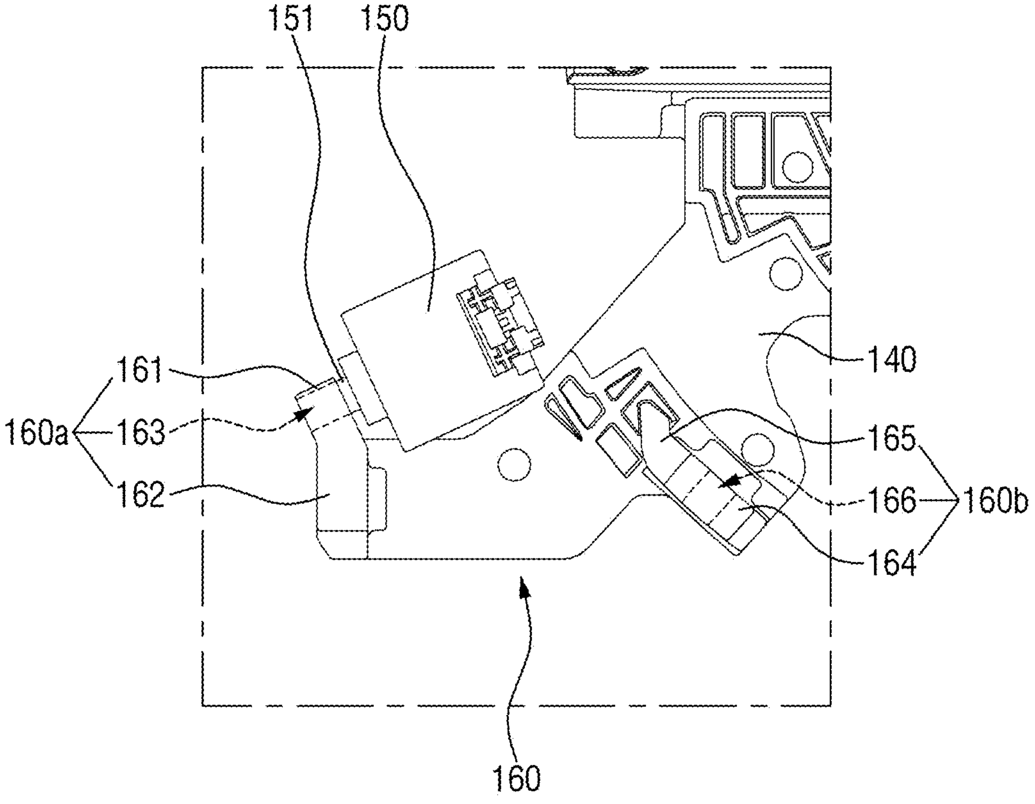
FIGS. 5 through 11 are front views illustrating the relationship between a solenoid and the rotation lever depending on the transmission position of the transmission control apparatus of FIG. 1.
Figure 6:
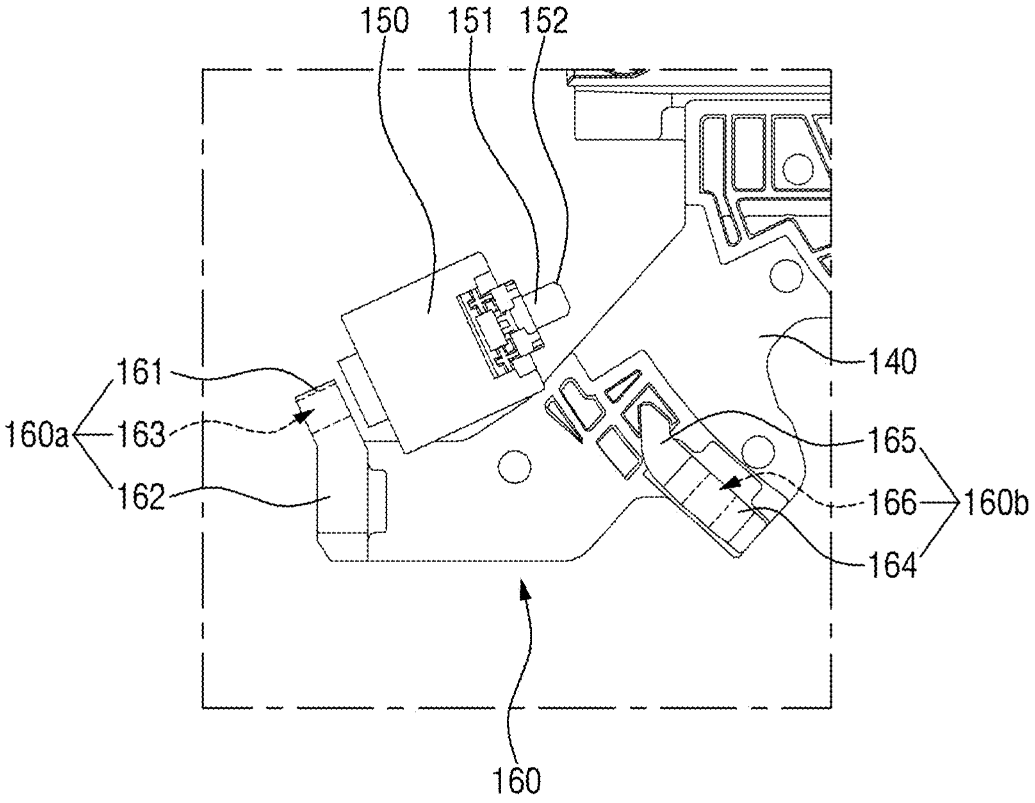

More specifically, FIGS. 5 and 6 depict the fixing means 160 when the transmission shifter 130 of FIG. 1 is positioned at the P position.

Referring to FIG. 5, the plunger 151 may be inserted in the aperture 163 of the first interfering member 161 while protruding to the first side (or the outer side) of the solenoid 150. In this case, the brake (not illustrated) may be in an inactive state, and the solenoid 150 may also be in an off state. Here, the inactive state of the brake may refer to a state where the user (or the driver) is not pressing the brake pedal, and the active state of the brake may refer to a state where the user is pressing the brake pedal. The off state of the solenoid 150 may refer to a state where the plunger 151 is protruded to the first side of the solenoid 150 due to the power to the solenoid 150 being cut off, and the on state of the solenoid 150 may refer to a state where the plunger 151 is protruded to the second side of the solenoid 150 due to power being supplied to the solenoid 150. In other words, an elastic bias force may be provided such that the plunger 151 may protrude to the first side of the solenoid 150 when the solenoid 150 is powered off.

In the state depicted in FIG. 5, the transmission position may not be changed. In other words, when the vehicle is stationary, the movement (or rotation) of the transmission shifter 130 may be restricted, regardless of whether the ignition is on, unless the brake pedal is pressed.

Referring to FIG. 6, if the brake pedal is pressed in the state depicted in FIG. 5, power may be supplied to the solenoid 150, causing the plunger 151 to protrude to the second side of the solenoid 150 and allowing the movement of the transmission shifter 130. In the state depicted in FIG. 6, with the brake pedal pressed and the ignition on, the transmission shifter 130 may be moved from the P position to the D position in a single action.

Figure 7:
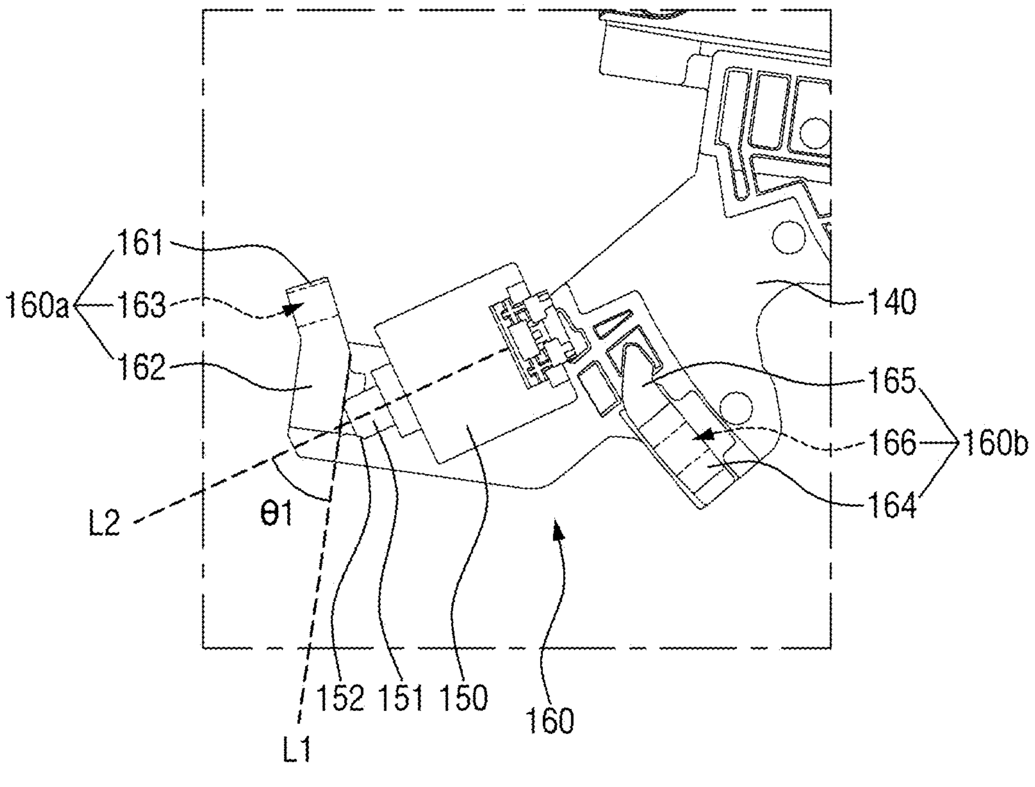

FIG. 7 illustrates a state where the rotation lever 140 is moved away from the solenoid 150 to a location between the P and R positions. FIG. 7 can apply to both cases where the rotation lever 140 moves from the P position to the R position and from the R position to the P position.

Referring to FIG. 7, regardless of the brake being on/off, the solenoid 150 may be turned off. For example, when the rotation lever 140 moves from the P position to the R position, the moment the bullets 141 crossing over the hill (i.e., peak) between the P and R positions on the groove members 142 may be detected through the magnetic body 112 and the position sensor, and the plunger 151 may be controlled to protrude from the second side to the first side of the solenoid 150. More specifically, in response to the position sensor detecting the movement of the magnetic body 112 in the process of crossing over the hill between the P and R positions, it may be determined that the rotation lever 140 is currently passing through a predetermined point between the P and R positions, and the plunger 151 may be configured to protrude to one side thereof based on the signal from the position sensor. For example, the predetermined point between the P and R positions may be a 50% point between the P and R positions.

In the state depicted in FIG. 7, the plunger 151 may desirably protrude toward the first inclined member 162 before coming into contact with the second inclined member 165. For example, if the user moves (or rotates) the transmission shifter 130 faster than the speed of the plunger 151 protruding to the first side of the solenoid 150, or if the protrusion of the plunger 151 occurs past the 50% point, the second end of the plunger 151 may come into contact with the second inclined member 165 before the first end of the plunger 151 comes into contact with the first inclined member 162. As the second end of the plunger 151 comes into contact with the second inclined member 165, a transmission impact or shock may occur because both the protrusion of the plunger 151 to the first side of the solenoid 150 and the contact of the plunger 151 with the second inclined member 165 occur concurrently. However, the plunger 151 may be pressed toward the first side as the second end of the plunger 151 rides over the second inclined member 165.

Here, a contact angle θ1 formed by an imaginary line L1, which extends from the upper surface of the first inclined member 162, and an imaginary line L2, which represents the axial direction of the plunger 151, may be set in a range of about 50 to about 65 degrees. By way of example, the contact angle θ1 may be about 58 degrees.

Figure 8:
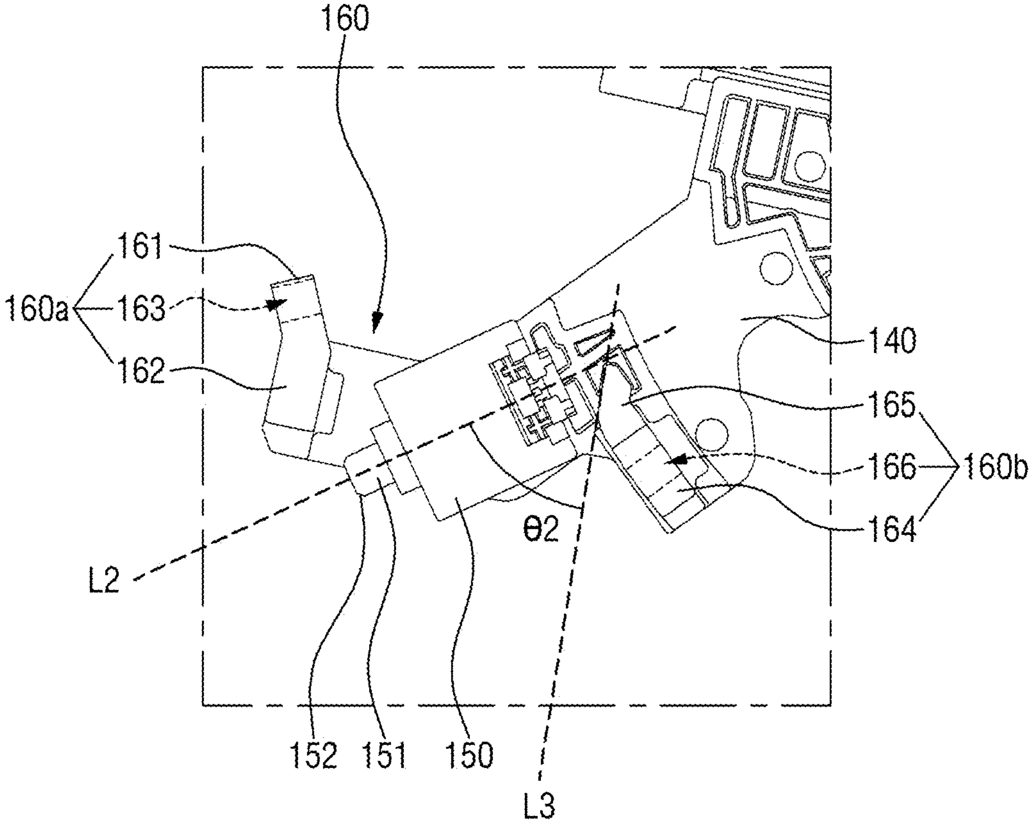
Figure 9:
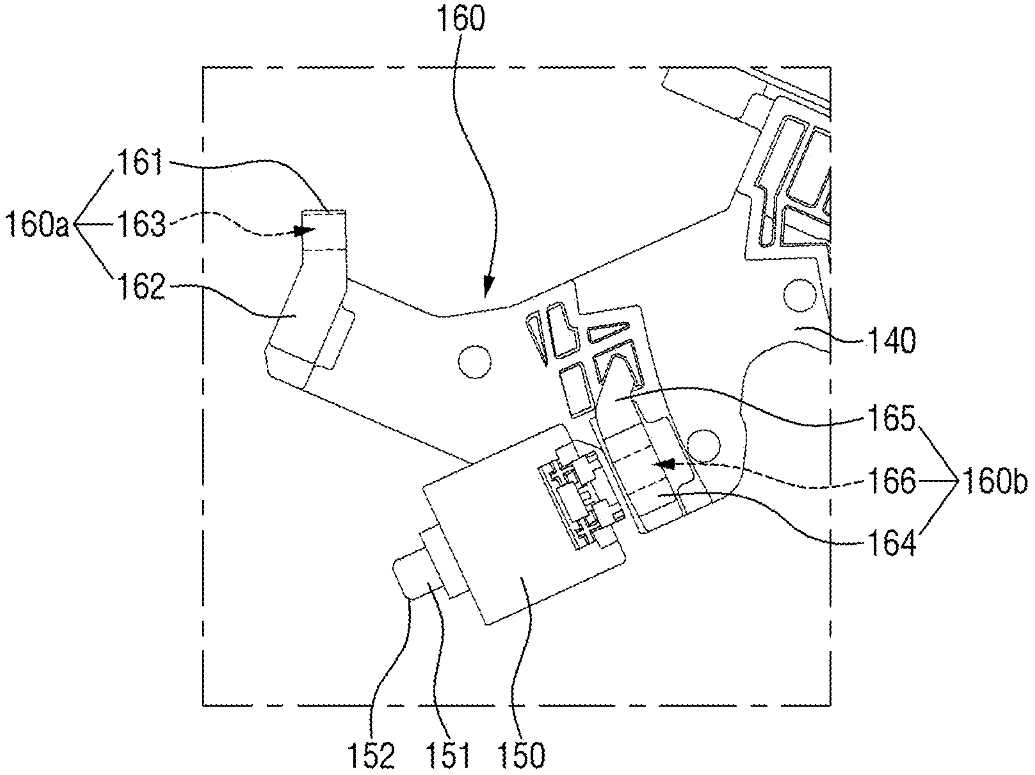
Figure 10:
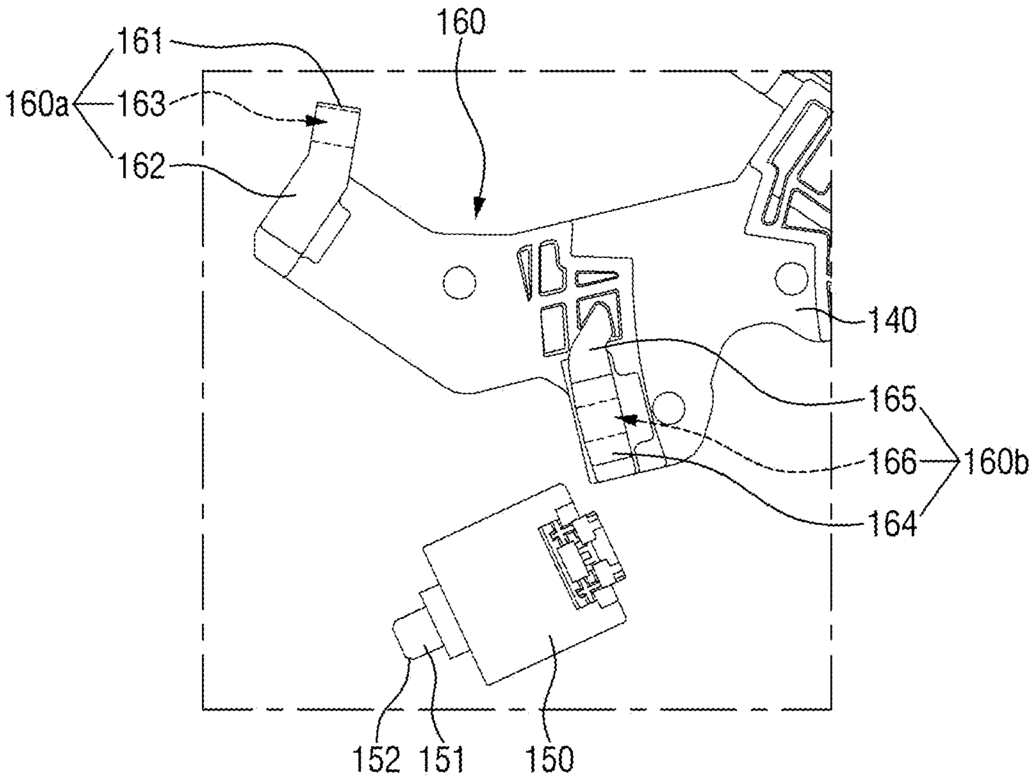

FIG. 8 illustrates the position of the fixing means when the transmission position is the R position, FIG. 9 illustrates the position of the fixing means when the transmission position is the N position, and FIG. 10 illustrates the position of the fixing means when the transmission position is the D position. Referring to FIGS. 8 through 10, at the R, N, and D positions, the solenoid 150 may be turned off regardless of whether the brake is on or off.

Here, a contact angle θ2 formed by an imaginary line L3, which extends from the upper surface of the second inclined member 165, and the imaginary line L2, which represents the axial direction of the plunger 151, may be set within a range of about 36 to about 50 degrees. By way of example, the contact angle θ2 may be about 45 degrees.

During normal driving, the fixing means 160 may generally not affect the operation of the solenoid 150 when the transmission position is changed among the R, N, and D stages.

Figure 11:
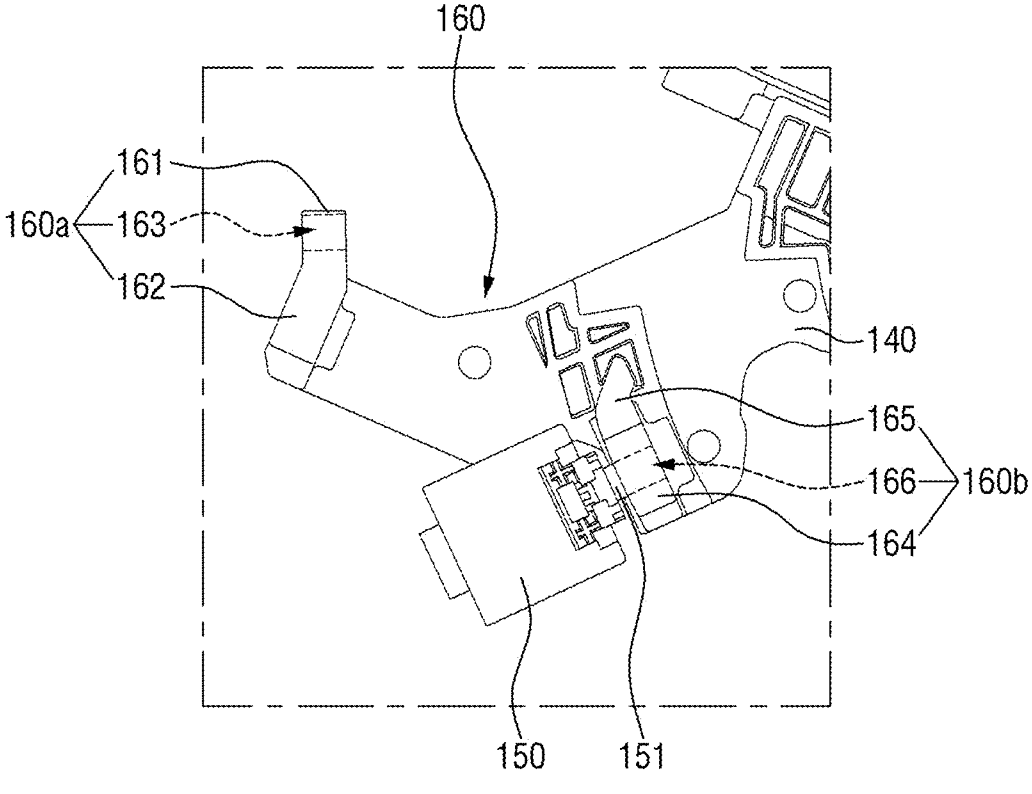

On the contrary, referring to FIG. 11, which depicts the position of the fixing means when the transmission position is the N position, under particular conditions, the plunger 151 may protrude toward the second side of the solenoid 150 and may be at least partially inserted into the aperture 166 of the second interfering member 164. For example, the particular conditions may be set to include states where the brake is off and the speed of the vehicle is 2 km/h or less.

For example, when the vehicle is stopped on level ground and the rotation lever 140 is placed at the N position with the driver not pressing the brake pedal, the plunger 151 may be engaged with the second interfering member 164, thereby restricting the movement of the transmission shifter 130. This N-position locking feature may be used to prevent unintended shifting of the transmission shifter 130 to the R or D position by the driver or passenger, which may lead to a safety concern. Then, when the driver presses the brake pedal to initiate the brake on state, the plunger 151 may move to the first side of the solenoid 150, allowing for gear shifting.

Further, according to the present disclosure, the user may move the transmission shifter 130 from the D position to the P position regardless of whether the vehicle's ignition is on or off. More specifically, if the solenoid 150 remains off in the D position, no interference occurs with the fixing means 160 during the N and R positions. Also, in the process of moving the transmission shifter 130 from the R position to the P position, the plunger 151 that is protruded to the first side of the solenoid 150 (due to its off state) may abut the first inclined member 162, and the first end of the plunger 151 may ride over the first inclined member 162 and thus be pressed toward the second side of the solenoid 150 while being able to move to the P position.

If the transmission shifter 130 is moved from the D position to the P position when the vehicle is in motion, the transmission shifter 130 may be able to be shifted to the P position, but since the transmission (not illustrated) needs to maintain the D position in consideration of the driving status of the vehicle, the driver may be alerted about the mismatch between the position of the transmission shifter 130 and the actual operation of the transmission, and may be guided to move the transmission shifter 130 back to the D position.

For example, if the vehicle is stopped and the power is off due to, for example, an accident, the transmission shifter 130 may be movable from the D position to the P position even without pressing the brake pedal. Since the plunger 151 locks with the first interference member 161 in the P position, a shift to the P position may be enabled even if there is a problem with the operation of the solenoid 150.

Therefore, according to embodiments of the present disclosure, since the fixing means 160 includes the first inclined member 162, shifting to P position may be enabled even when the power to the solenoid 150 is off. Additionally, since the fixing means 160 also includes the second inclined member 165, the plunger 151 may be prevented from impacting the second interfering member 164 when the transmission position is rapidly changed from the P position to the R position. Furthermore, unintended shifting of the transmission shifter 130 can be prevented when the vehicle is stopped and the transmission shifter 130 is put in the N position.

Embodiments of the present disclosure have been described with reference to the accompanying drawings. However, it should be understood that the present disclosure is not limited to these embodiments and can be implemented in various other forms. Those skilled in the art to which the present disclosure pertains, with ordinary knowledge in the field, will understand that the technical concepts or essential features of the present disclosure can be implemented in different specific forms without altering their essence. Therefore, the embodiments described above should be considered exemplary and not restrictive in any way.

What is claimed is:

1. A transmission control apparatus comprising:

a housing;

an inner shaft configured to be rotatable within a predetermined angular range with respect to the housing;

a rotation lever configured to be rotatable along with the inner shaft to set a transmission position to one of Park (P), Reverse (R), Neutral (N), or Drive (D) positions;

a solenoid disposed in the housing and configured to be interfered with the rotation of the rotation lever, wherein the solenoid includes a plunger that moves between a first side and a second side with respect to the solenoid; and a fixing means included in the rotation lever and configured to interfere with the solenoid, wherein the fixing means includes interfering members, which are formed to be engageable with the plunger when the plunger protrudes to one of the first side or the second side of the solenoid, and inclined members, which are inclined from the interfering members to press the plunger toward the other of the first side or the second side of the solenoid, and wherein the fixing means comprises:

a first fixing part, which is provided on one side of the fixing means to selectively interfere with the plunger of the solenoid when the plunger is protruded to the first side of the solenoid; and a second fixing part, which is provided on the other side of the fixing means to selectively interfere with the plunger of the solenoid when the plunger is protruded to the second side of the solenoid.

2. The transmission control apparatus of claim 1, wherein the first fixing part comprises:

a first interfering member, which is configured to interfere with the rotation of the rotation lever from the P position to one of the R, N, or D positions when the plunger is protruded to the first side of the solenoid; and a first inclined member, which is inclined with respect to the first interfering member and configured to press the plunger toward the second side of the solenoid when the rotation lever rotates to the P position from any other positions.

3. The transmission control apparatus of claim 2, wherein the first inclined member is formed as an inclined surface having an angle of 50° to 65° with respect to a direction of movement of the plunger.

4. The transmission control apparatus of claim 1, wherein the second fixing part comprises:

a second interfering member, which is configured to interfere with the rotation of the rotation lever from the N position to another position when the plunger is protruded to the second side of the solenoid; and a second inclined member, which is inclined with respect to the second interfering member and configured to press the plunger toward the first side of the solenoid when the rotation lever rotates from the P position to another position.

5. The transmission control apparatus of claim 4, wherein the first interfering member and the second interfering member are spaced apart within the predetermined angular range around the solenoid.

6. The transmission control apparatus of claim 4, wherein the first inclined member and the second inclined member are spaced apart within the predetermined angular range around the solenoid and are disposed closer to each other than the first and second interfering members.

7. The transmission control apparatus of claim 4, wherein the second inclined member is formed as an inclined surface having an angle of 36° to 50° with respect to a direction of movement of the plunger.

8. The transmission control apparatus of claim 4, wherein the plunger includes an inclined surface that corresponds to an inclination angular range of the first inclined member or the second inclined member where the plunger abuts the first inclined member or the second inclined member.

9. The transmission control apparatus of claim 4, further comprising:

a magnetic body disposed on one of the rotation lever or the housing; and a position sensor disposed on the other of the rotation lever or the housing and configured to detect relative movement or rotation of the rotation lever with respect to the housing based on a magnetic field generated by the magnetic body.

10. The transmission control apparatus of claim 9, wherein in response to the rotation lever being positioned at the P position, power to the solenoid being turned off, and a brake pedal having been released, the plunger protrudes to the first side of the solenoid to be engaged with the first interfering member and thereby limits the rotation of the rotation lever.

11. The transmission control apparatus of claim 9, wherein in response to a brake pedal being operated at the P position, power is supplied to the solenoid so that the plunger is protruded to the second side of the solenoid, and the rotation lever becomes rotatable.

12. The transmission control apparatus of claim 9, wherein the plunger is configured to protrude to the first side of the solenoid in response to the position sensor detecting that the rotation lever has passed through a predetermined point between the P position and the R position while rotating from the P position to the R position.

13. The transmission control apparatus of claim 12, wherein when the rotation lever passes through the predetermined point between the P position and the R position, and the rotation speed of the rotation lever exceeds a speed at which the plunger protrudes to the first side of the solenoid, the second inclined member pushes a second end of the plunger to allow the plunger to protrude to the first side of the solenoid.

14. The transmission control apparatus of claim 9, wherein in response to the rotation lever being rotated from one of the R, N, or D positions to the P position, the first end of the plunger rides over the first inclined member to allow the plunger to be engaged with the first interfering member.

15. The transmission control apparatus of claim 9, wherein in response to the rotation lever being positioned at the N position, a brake pedal having been released, and a vehicle's speed being within a predetermined range, the plunger protrudes to the second side of the solenoid and is at least partially inserted into the second interfering member to prevent the rotation of the rotation lever.

16. A transmission control apparatus comprising:

a housing;

an inner shaft configured to be rotatable within a predetermined angular range with respect to the housing;

a rotation lever configured to be rotatable along with the inner shaft to set a transmission position to one of Park (P), Reverse (R), Neutral (N), or Drive (D) positions;

a solenoid disposed in the housing and configured to be interfered with the rotation of the rotation lever, wherein the solenoid includes a plunger that moves between a first side and a second side with respect to the solenoid; and a fixing means included in the rotation lever and configured to interfere with the solenoid, wherein the fixing means includes interfering members, which are formed to be engageable with the plunger when the plunger protrudes to one of the first side or the second side of the solenoid, and inclined members, which are inclined from the interfering members to press the plunger toward the other of the first side or the second side of the solenoid, wherein the inner shaft includes a first rotation axis, about which the inner shaft rotates to be spaced apart from the housing, wherein the rotation lever includes a second rotation axis, about which the rotation lever rotates along with the inner shaft within the predetermined angular range, and wherein the first rotation axis and the second rotation axis are substantially perpendicular.

17. The transmission control apparatus of claim 16, further comprising:

a transmission shifter coupled to a distal end of the inner shaft, wherein in response to the transmission shifter being rotated about the first rotation axis so that a proximal end of the inner shaft is moved away from the housing, the transmission shifter becomes rotatable about the second rotation axis to select one of the P, N, R, or D positions.

18. A transmission control apparatus comprising:

a housing;

an inner shaft configured to be rotatable within a predetermined angular range with respect to the housing;

a rotation lever configured to be rotatable along with the inner shaft to set a transmission position to one of Park (P), Reverse (R), Neutral (N), or Drive (D) positions;

a solenoid disposed in the housing and configured to be interfered with the rotation of the rotation lever, wherein the solenoid includes a plunger that moves between a first side and a second side with respect to the solenoid;

a fixing means included in the rotation lever and configured to interfere with the solenoid, wherein the fixing means includes interfering members, which are formed to be engageable with the plunger when the plunger protrudes to one of the first side or the second side of the solenoid, and inclined members, which are inclined from the interfering members to press the plunger toward the other of the first side or the second side of the solenoid; and an elastic member, which elastically biases an end of the inner shaft away from the rotation lever and toward the housing.

* * * * *